United States Patent [19]

Needham

[11] 4,262,661

[45] Apr. 21, 1981

[54] SOLAR ENERGY ABSORPTION MATERIAL OR COATING COMPRISING AN ARYLENE SULFIDE POLYMER

[75] Inventor: Donald G. Needham, Bartlesville, Okla.

[73] Assignee: Phillips Petroleum Company, Bartlesville, Okla.

[21] Appl. No.: 754,761

[22] Filed: Dec. 27, 1976

[51] Int. Cl.³ ................................................ F24J 3/02
[52] U.S. Cl. ................................... 126/452; 126/901; 126/417; 260/37 R; 428/160; 428/419; 428/457
[58] Field of Search ...................... 260/79, 79.1, 37 R; 428/419, 457, 160; 126/270, 271, 452, 901, 417; 136/89 PC

[56] References Cited

U.S. PATENT DOCUMENTS

| 3,354,129 | 11/1967 | Edmonds et al. | 260/79 |
| 3,869,434 | 3/1975 | Campbell et al. | 260/79 |

Primary Examiner—V. P. Hoke

[57] ABSTRACT

A solar energy absorption material or coating is applied to a material or substance to which or through which solar energy is to be conducted. The coating is comprised or comprises at least in part an arylene sulfide polymer, e.g. polyphenylene sulfide. The coating is applied to water pipes, panels, e.g. roof panels and the like. Improvement of absorption of solar energy in excess of 6 percent has been obtained.

5 Claims, No Drawings

SOLAR ENERGY ABSORPTION MATERIAL OR COATING COMPRISING AN ARYLENE SULFIDE POLYMER

This invention relates to the absorption of solar energy. In one of its aspects it relates to a coating for better absorption of solar energy by a material to which or through which solar energy is to be conducted. In a more specific aspect of the invention it relates to coating of pipes, panels, roof panels, and more generally, to the coating of any material or substance to which solar energy is to be conducted.

In one of its concepts the invention relates to a material or substance to which or through which solar energy is to be conducted at least a portion of the boundary of which is formed of or coated with an arylene sulfide polymer. In another of its concepts the invention relates to a water-heating pipe or panel coated with an arylene sulfide polymer, e.g. polyphenylene sulfide. In a further concept of the invention the coating or boundary material which comprises the arylene sulfide polymer can also comprise another material for example, a metal having good heat conductivity, e.g. metal filings, for example copper filings.

It is well known that the United States is now dependent upon sources abroad for up to about 40 percent of the energy generated here from oil. Oil, and products generated therefrom, supplies the overwhelming readily available energy raw material of this country.

Presently, solar energy has been used in various ways. At home it has been used by simply drawing back blinds and allowing the sun's rays to penetrate into a room which is thus warmed. Roof panels or pipes have been installed through which water is circulated to be heated by the solar energy thus captured.

It is also known to capture solar energy by way of solar cells which produce electricity.

Except for the very simple applications which produce heat from solar energy as in the first example above-given relating to heating a room in a house, the application of solar energy to, in a real way, replace any substantial amount of oil-produced energy has been uneconomical. Accordingly, it is desirable to improve methods for capturing and/or absorbing solar energy so that it may be converted to uses benefiting mankind.

It is an object of this invention to provide a method and means for improved capture and/or absorption of solar energy. It is another object of this invention to provide a coating or boundary substance which will produce and improve capture or absorption of solar energy. It is a further object of this invention to produce such a coating which can be applied to existing solar energy capture or absorption means such as pipes or panels for heating of water.

Other aspects, concepts and objects and the several advantages of the invention are apparent from a study of this disclosure and the appended claims.

According to the present invention there is provided a method of improved capture and/or absorption of solar energy which comprises utilizing an arylene sulfide polymer as a coating or boundary on or for a material or substance to which or through which solar energy is to be conducted. Also, according to the present invention there is provided a coating or boundary comprising for at least a part thereof an arylene sulfide polymer.

I have now found polyphenylene sulfide to be an exceptionally good ultraviolet ray absorber. The absorbed ultraviolet appears to be changed to heat which, in addition to the infrared absorbed, makes it an efficient coating for solar heating systems for example, a series of water pipes heated by the sun or roof panels over which water is circulated to absorb the heat.

The improvements of the order of in excess of 6 percent have been obtained.

The following data show that about 5 to about 7° F. differences are obtained over a black enamel coating on a same aluminum substrate. Such improvements amount to 4.5 percent and 6.2 percent respectively.

EXAMPLE

Aluminum, alone, and coated with black enamel, polyphenylene sulfide and with polyphenylene sulfide containing 2 percent carbon black was placed in sun light for three hours and surface temperatures were checked. The temperatures respectively were 92°, 112°, 117° and 119° F. respectively.

An addition to the advantageous capture and/or absorption of solar energy by the arylene sulfide polymer is that it coats and protects the coated metal or other substance against the elements and even against the rays of the sun.

Arylene sulfide polymers or coatings comprising the same are described in U.S. Pat. Nos. 3,652,327 issued Mar. 28, 1972, Hill, Jr. et al, and 3,776,880 issued Dec. 4, 1973 to Jennings P. Blackwell.

Applicable arylene sulfide polymers include polymers of the type which are prepared as described in U.S. Pat. No. 3,354,129. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit -R-S-where R is phenylene, biphenylene, naphthalene, biphenyl ether, or a lower alkyl-substituted derivative thereof. By "lower alkyl" is meant alkyl groups having 1 to 6 carbon atoms such as methyl, ethyl, propyl, isobutyl, hexyl, and the like. Preferably the arylene sulfide polymers having melting temperatures within the range of about 400°–900° F. If desired, the arylene sulfide polymer can be lightly cured, i.e. the molecular weight of the polymer can be increased by cross-linking or chain extension, e.g. by heating moderately prior to application to the substrate.

Further information on the preparation of arylene sulfide polymers and coatings therefrom is available in the above-mentioned patents and, generally, in the prior art.

Reasonable variation and modification are possible within the scope of the foregoing disclosure, and the appended claims to the invention the essence of which is that arylene sulfide polymer, e.g. polyphenylene sulfide and/or a coating or boundary substance comprising the same has been found to increase the capture and/or absorption of solar energy.

I claim:

1. A method for capturing and/or absorbing and utilizing solar energy which comprises exposing an arylene sulfide polymer to the sun's rays and then utilizing the heat thus created.

2. A method according to claim 1 wherein the arylene sulfide polymer is polyphenylene sulfide.

3. A method for the improved capture and/or absorption of sun's rays, to create heat and ultimately to utilize the same, which comprises coating a material or substance adapted to capture and/or to conduct heat derived from solar energy with an arylene sulfide polymer, exposing said coating to the sun's rays, thereby absorbing energy as heat, and transmitting said heat from said coating to a place of utilization.

4. A method according to claim 3 wherein the arylene sulfide polymer is polyphenylene sulfide.

5. A method according to claim 1 wherein the polymer contains additive carbon black.

* * * * *